United States Patent [19]

Takahashi

[11] 4,219,843
[45] Aug. 26, 1980

[54] PROJECTION TYPE COLOR TELEVISION SYSTEM

[75] Inventor: Yoshimasa Takahashi, Moriguchi, Japan

[73] Assignee: Sanyo Electric Co., Ltd., Osaka, Japan

[21] Appl. No.: 887,767

[22] Filed: Mar. 17, 1978

[30] Foreign Application Priority Data

Mar. 17, 1977 [JP] Japan .................................. 52-30683

[51] Int. Cl.² .............................................. H04N 9/31
[52] U.S. Cl. ......................................... 358/60; 358/64
[58] Field of Search .............................. 358/29, 60, 64

[56] References Cited

U.S. PATENT DOCUMENTS 4,032,968  6/1977  Miyoshi et al. ........................ 358/60
4,087,835  5/1978  Nishimura et al. .................... 358/60

Primary Examiner—Robert L. Griffin
Assistant Examiner—Joseph A. Orsino, Jr.
Attorney, Agent, or Firm—Armstrong, Nikaido, Marmelstein & Kubovcik

[57] ABSTRACT

A projection type color television system of the present disclosure comprises three cathode ray tubes for projecting a color picture on a projecting screen. The three cathode ray tubes have phosphor screens for producing and projecting onto the projecting screen respective three primary colors of light beam containing an image information in the beam. These cathode ray tubes are positioned with their respective phosphor screens placed on a first imaginary plane parallel to the projecting screen and in alignment with each other along a first imaginary line parallel to a horizontal scanning direction of the light beam. Of these tubes, a cathode ray tube producing a color having the highest amount of brightness measured in lumen is positioned intermediately between the other cathode ray tubes. Color signals applied to the two cathode ray tubes positioned one on each side of the intermediate cathode ray tube are corrected in such a manner that the ratio of the brightness of the primary colors is maintained at a predetermined ratio.

3 Claims, 15 Drawing Figures

PROJECTION TYPE COLOR TELEVISION SYSTEM

BACKGROUND OF THE INVENTION

The present invention relates to a projection type color television system and, more particularly, to a correction circuit employed for correcting color luminance or brightness of an image projected on a screen of a color television set.

Generally, the projection type color television system has three cathode ray tubes disposed side by side to each other and each of the tubes emits light beams of one of different primary colors, red, green and blue, onto a projecting screen through a lens assembly. The three different color light beams form a proper color picture when they are projected onto the projecting screen in such a manner that images of different color are superimposed one over the other without any displacement. For accomplishing complete and perfect overlapping of the three different color images, it is necessary to produce the three different color light beams from exactly the same place. However, since it is impossible for the three cathode ray tubes to occupy the same place at the same time, they are aligned side by side to minimize the displacement of the light source between the three different primary colors.

The U.S. Patent Application Ser. No. 749,281, filed on Dec. 10, 1976 now U.S. Pat. No. 4,087,835 (in which the inventor of the present invention is involved), and my copending U.S. Patent Application Ser. No. 839,597, filed on Dec. 5, 1977, both assigned to the same assignee of the present invention, discloses such an arrangement as shown in FIG. 1 of the accompanying drawing. In the arrangement shown in FIG. 1, glass faceplates 11, 12 and 13 of respective cathode ray tubes 1, 2 and 3 are positioned on an imaginary plane which is in parallel to the projecting screen S and principal planes 04, 05 and 06 of the three lens assemblies L1, L2 and L3 are also positioned in another imaginary plane which is in parallel relation to the projecting screen S. It is also disclosed that the screen S includes a plate member 7 made of transparent material such as acrylic resin, having one surface facing the cathode ray tubes and formed into a lenticular lens, and the other surface being mat finished for forming a diffuser surface.

With such optical arrangement described above where the lens characteristics of the lens assemblies L1, L2 and L3 are alike to each other, the images of different color can be, after having passed through the respective lens assemblies, magnified so equally that, when they are projected onto the screen, the images of different color geometrically match with each other. Thus, the projected images in three different colors on the projecting screen S are properly superimposed one above the other to reproduce a color picture having no disadvantageous color displacement in such a manner with the distance D between the neighboring tubes being comparatively large. Furthermore, since a first plane including the phosphor screens of the three cathode ray tubes, a second plane including principal planes of the lens assemblies and a third plane including the projecting screen face are in parallel to each other, the proper focusing planes for the different color light beams projected from the three cathode ray tubes coincide with each other on the third plane including the projecting screen face. Therefore, from this aspect, in the optical arrangement of U.S. Patent Application Ser. No. 749,281, a relatively highly fast lens can be employed for each of the lens assemblies. With such arrangement described above, the lens assemblies applied in the optical arrangement were able to accommodate as bright as f/stop of 2.0, whereas those applied in the other arrangements were able to accommodate f/stop of 2.8, in obtaining the same reasonable color picture perceived by the human eyes, under the conditions in which the magnification of the lens assemblies is six and the diagonal distance of the screen is 750 m/m with the same projecting distance. Therefore, the brightness of the projected color picture on the screen with the optical arrangement of the above described type is twice as bright as those of the other types.

Although the optical arrangement of the above described type is superior to those of other types from the points of brightness and matching of projected images of three different colors, there have been a problem associated with an irregularity in the established color picture projected on the screen when the three color images are to be mixed. According to the previously mentioned copending U.S. patent applications, such disadvantage is eliminated by presentation of a screen assembly which is so assembled as to diffuse the light beam horizontally in a great angle of diffusion relative to the direction of travel of the incoming light beam and to diffuse the light beam vertically in a small angle of diffusion relative to the direction of travel of the incoming light beam. In contrast to such presentation of screen assembly, the present invention employs a correction circuit for eliminating irregularity in the established color images.

SUMMARY OF THE INVENTION

Accordingly, a primary object of the present invention is to provide a projection type color television system which has a correction circuit for eliminating irregularity in the established color images.

Another object of the present invention is to provide a projection type color television system of the above described type which is capable of maintaining the ratio of brightness of projected image on the center of the screen to that on the peripheral edge portions of the screen within 2:1.

Further object of the present invention is to provide a projection type color television system of the above described type which is simple in construction and can readily be manufactured.

In order to accomplish these and other objects of the present invention, a projection type color television system according to the present invention includes three cathode ray tubes for projecting a color picture on a projecting screen. The three cathode ray tubes have phosphor screens for producing and projecting onto the projecting screen respective three primary colors of light beam containing an image information in the beam. The three cathode ray tubes are positioned with their respective phosphor screens placed on a first imaginary plane in parallel to the projecting screen and in alignment with each other along a first imaginary line parallel to a horizontal scanning direction of the light beam. Of these cathode ray tubes, a cathode ray tube producing a color having the highest amount of brightness measured in lumen is positioned intermediately between the other two cathode ray tubes. Color signals applied to the two cathode ray tubes positioned one on each side of the intermediate cathode ray tube are corrected in such a manner that the brightness of the image projected onto the screen from said two cathode ray tubes can maintain in a predetermined ratio with respect to the brightness of the image projected onto the screen from the intermediate cathode ray tube.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
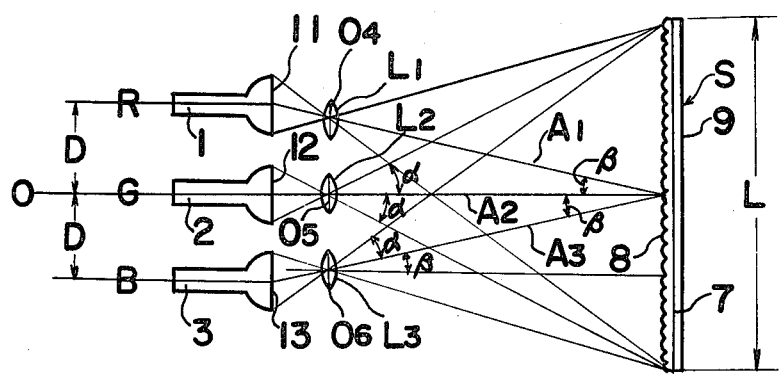
FIG. 1 is a schematic view showing an optical arrangement of the projection type color television system embodying the present invention.

Before the description of the present invention proceeds, it is to be noted that like parts are designated by like reference numerals throughout the accompanying drawings.

Referring again to FIG. 1, an optical axis A1 for the light beam projected from the cathode ray tube 1 is inclined at an angle of $\beta$ from an optical axis A2 for the light beam projected from the cathode ray tube 2. Likewise, an optical axis A3 for the light beam projected from the cathode ray tube 3 is inclined towards the other side of the axis A2 at an angle $\beta$ from the axis A2. Hence, the light beams projected from the cathode ray tubes 1 and 3 and gathered by the respective lens assemblies L1 and L3 are inclined at the same angle of $\beta$ from the axes of the respective cathode ray tubes 1 and 3.

Assuming that the image on the phosphor screen of each cathode ray tube has uniform brightness and is perfectly diffused and that each lens assembly has the relative aperture of unity and has equal spectral transmittance for the three colors, the brightness of the image on the projecting screen S becomes deflected in such a manner as to decrease the brightness as the image departs from the axis of each lens assembly. Assuming that the brightness of the image projected from the cathode ray tube 2 on the projecting screen S at the center thereof is unity, the relative brightness of the image on the screen S is equal to $\cos^4\theta$, therein $\theta$ is an angle of light beam emitted from the lens assembly. Such relation is known as the law of cosine of the fourth power of the angle.

Further consideration is now had to the relation between the brightness of the light beams of the three different colors, red, green and blue, projected from the cathode ray tubes 1, 2 and 3, respectively, and the reproduced color picture on the screen S.

If fluorescent tubes, registered under No.P-22 to JEDEC (Joint Electron Device Engineering Council) are employed as light sources, the coordinates of the primary colors, red, green and blue, on a CIE (Commission Internationale de l'eclairage) chromaticity diagram are:

| Red | x = 0.660 | y = 0.334 |
| Green | x = 0.286 | y = 0.606 |
| Blue | x = 0.151 | y = 0.061 |

In order to obtain white color on the screen S by using the above described three primary colors, the ratio of the amount of light of the three primary colors in lumen can be given by an equation as follows:

$$\text{Red:Green:Blue} = 1:3.78:0.53 \qquad (1)$$

in which red is standardized as 1 lumen.

The coordinates of the obtained white color on the CIE chromaticity diagram are:

| White | x = 0.283 | y = 0.297 |

As apparent from the equation (1) above, the brightness of green light beam occupies more than half the brightness necessary to establish the white color. To establish the white color over the entire area of the screen S, it is necessary to meet the requirement of the equation (1) on every points over the screen S.

On the contrary, apart from the requirement to prepare the brightness of the three primary colors in the above given ratio, it is preferable to make every point on the screen to have an equal brightness. However, it is experientially found that the brightness at the peripheral edge portions of the screen, even if it is at least half the brightness at the center of the same screen would give normal condition of the projected image when perceived by the human eyes. In other words, the brightness of the screen can be considered practically acceptable if the ratio of brightness of the completed image at the center of the screen S to that at the peripheral edge portion of the screen is not more than 2:1. According to one embodiment of the present invention, this requirement is met by positioning a cathode ray tube emitting the brightest color, in this case, green, at a position intermediate between the other cathode ray tubes 1 and 3.

Under the condition that the brightness ratio of the screen center to the peripheral edge portions of the screen is arranged within the ratio of 2:1, now it is necessary to arrange the brightness ratio of the three different colors in the above given equation (1). Since it is possible to prepare each lens assembly to have relative aperture and spectral transmittance being substantially unity, it is understood that the irregularity in the established color picture projected on the screen is mainly caused by the law of cosine of the fourth power of the angle.

Referring again to FIG. 1, when a maximum angle $\alpha_m$ defined between the optical axis of the cathode ray tube 2 positioned at the center and an imaginary line extending between the center of the phosphor screen 12 of the tube 2 and the furthest edge of the screen is 17.8° and the angle $\beta$ defined between the optical axes A1 and A2 is 5.21°, the brightness of each color projected on the screen S is brightest on a spotted point at which the phosphor screen directly faces and is gradually decreased away from such spotted point. Such relation between the brightness of the projected image of a particular color and the point on the screen S is shown in FIG. 2, in which the axis of abscissas represents angle of projection of light beam and the axis of ordinates represents relative brightness. In the graph of FIG. 2, curves indicated by reference character R, G and B represent relative brightness of three different colors, red, green and blue, respectively. It is to be noted that the curves R, G and B are normalized to give a brightness of unity at the center of the screen. In other words, the brightness of the three primary colors at the center of the screen is so arranged as to maintain the previously given ratio.

Since the cathode ray tube 2 emitting green light beams, which is the brightest of all the three primary colors, is in face-to-face relation with the center of the screen while other two cathode ray tubes 1 and 3 are positioned one on each side of the cathode ray tube 2, the brightness of the completed image on the screen S is most efficiently distributed to result in a reasonable condition of the brightness.

Furthermore, since the ratio of total brightness to the brightness of green at the center of the screen S is 5.31:3.78, it is understood that the green light itself occupies more than half the brightness at the center. Even at the peripheral edge portion where the brightness of the green light is reduced to 80% thereof, as shown in FIG. 2, the green light still occupies more than half the brightness at the center, since the ratio of total brightness at the center of the screen to the brightness of green at the peripheral edge portions is 5.31:3.02.

Figure 2:
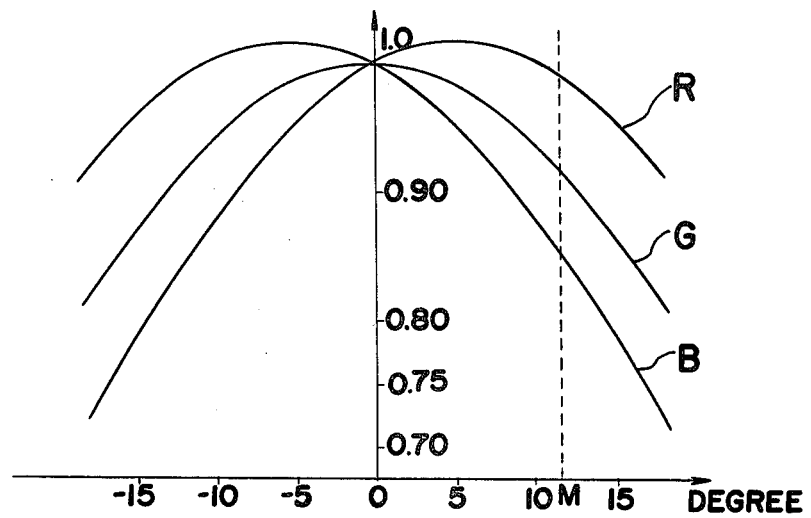
FIG. 2 is a graph showing a relative brightness of the three different primary colors projected onto the screen before being corrected.

It is to be noted here that the cathode ray tubes 1 and 3 may be reversed in position as compared with that shown in FIG. 1 with respect to the intermediate cathode ray tube 2.

By arranging the cathode ray tubes 1, 2 and 3 in the above described manner, the irregularity in the established color picture projected on the screen is corrected by changing the brightness of the colors, red and blue, with respect to the brightness of the color, green. More particularly, in the graph of FIG. 2, a point M, for example, needs correction in such a manner that the brightness of the red is reduced to match the brightness of the green and the brightness of the blue is increased to match the brightness of the green.

Such correction is effected over the entire area of the screen and the amount of correction necessary is given by the following equations:

$$b(\alpha) = \cos^4\alpha - \frac{\cos^4(\alpha + \beta)}{\cos^4\beta} \quad (2)$$

$$r(\alpha) = \cos^4\alpha - \frac{\cos^4(\alpha - \beta)}{\cos^4\beta} \quad (3)$$

in which $b(\alpha)$ is the amount of brightness necessary to correct the blue light beams emitted from the cathode ray tube 3 while $r(\alpha)$ is the amount of brightness necessary to correct the red light beams emitted from the cathode ray tube 1.

By putting the maximum angle $\alpha_m = 17.8°$ and the $\beta = 5.21°$ in the above given equations (2) and (3), the maximum amount of $b(\alpha)$ and $r(\alpha)$ would be approximately 0.10. Therefore, at maximum, it is necessary to increase or decrease 10% of the original brightness.

Figure 3:
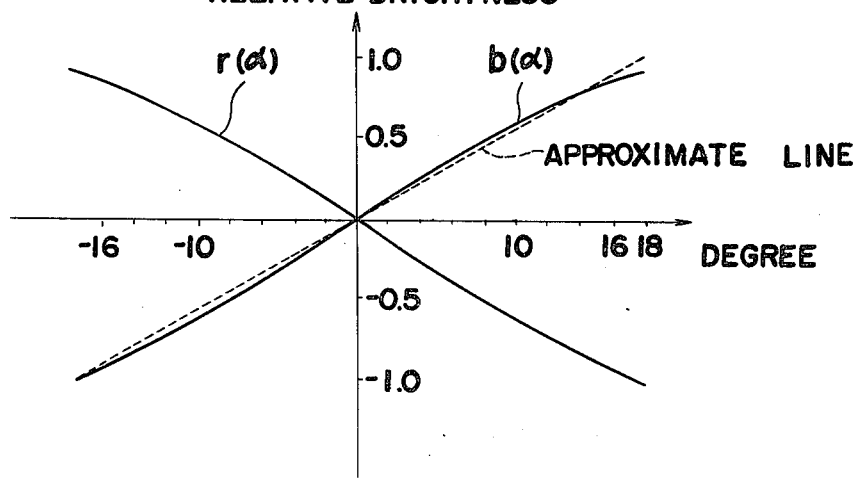
FIG. 3 is a graph showing curves of correction necessary for the red and blue light beams.

With respect to the brightness of the screen, the amount of correction necessary for the red and blue are shown in a graph of FIG. 3 in which the axis of abscissas represents the angle of projection of light beam and the axis of ordinates represents the relative brightness necessary to correct the corresponding color with respect to the original color. In the graph of FIG. 3, curves indicated by reference characters $r(\alpha)$ and $b(\alpha)$ represent relative brightness necessary to correct the colors red and blue, respectively. As apparent from the graph of FIG. 3, the curves $r(\alpha)$ and $b(\alpha)$ are somewhat in a shape of the figure "S", however, are approximately straight. Since the difference between the curve and the straight line is, at most, 8%, it is possible to take the straight line as an approximate value for the correction. Although the above equations (2) and (3) obtained under such a condition that the relative aperture of the lens assemblies L1, L2 and L3 are assumed to be unity, the correction curves $r(\alpha)$ and $b(\alpha)$ would be the same even if the relative aperture should change with respect to the change of the angle $\alpha$.

Such correction as shown in the graph of FIG. 3 is obtained by changing input voltage applied to the cathode ray tubes 1 and 3, and in carrying out such correction, it is necessary to take other factors into consideration, such as diffusion caracteristics of the screen, difference of the illumination ratio of the image projected on the screen caused by the relative aperture, the relation between the emissivity of the light from the fluorescent screens of the cathode ray tubes and beam current, the structure of an electron gun provided in each cathode ray tube, and voltage-current characteristics of such electron gun.

The description is now directed to one embodiment of the correction circuit to be employed in the projection type color television system of the present invention with rference to waveforms appearing at various points in the circuit.

Figure 4:
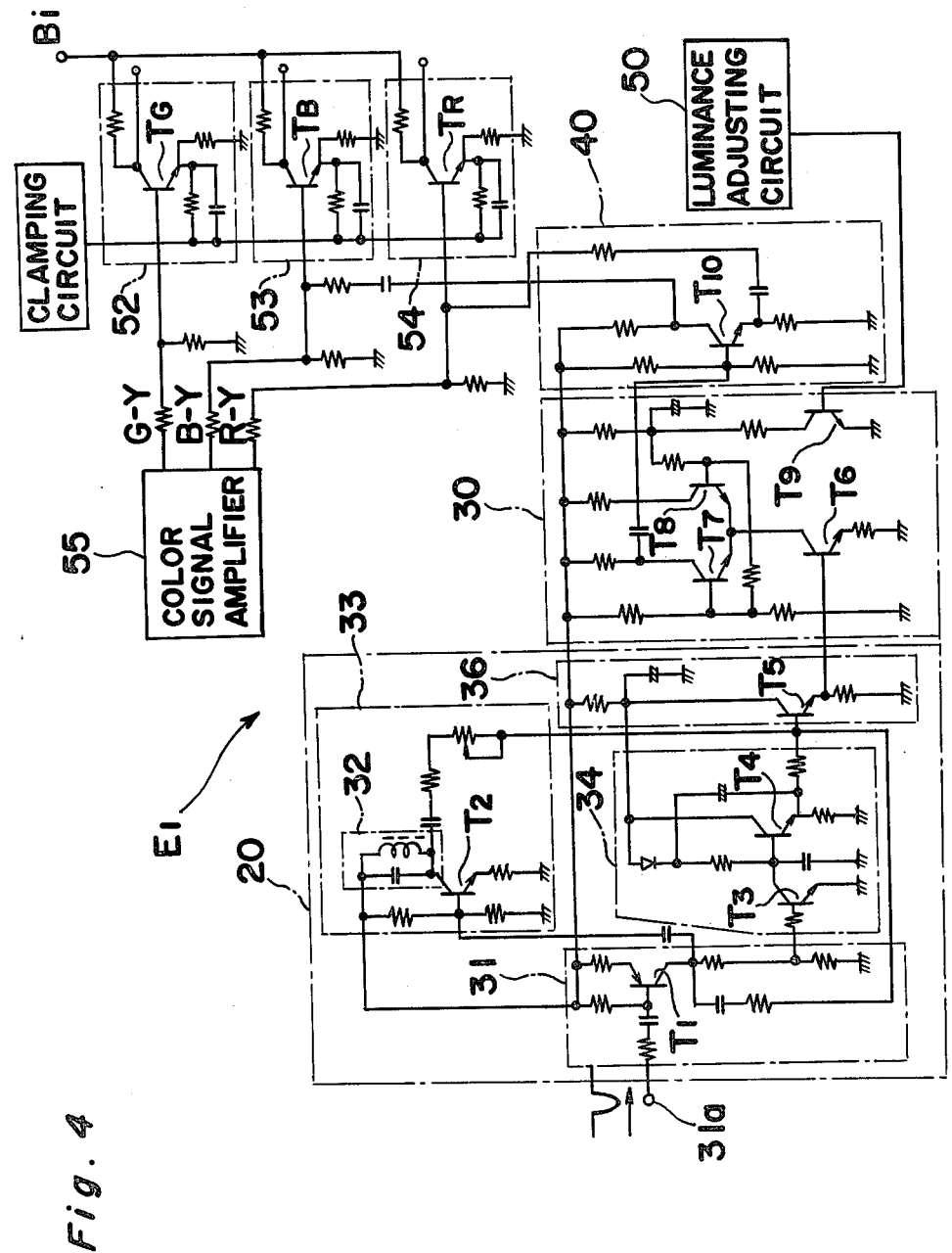
FIG. 4 is a circuit diagram for achieving the correction of brightness of the color beams.

Referring to FIG. 4, there is shown a correction circuit $E_1$ which comprises a waveform composition circuit 20, a DC amplifier 30 and a phase separation circuit 40 which are connected in series. The waveform composition circuit 20 includes a pulse amplifier 31 having a transistor $T_1$, a sine wave generator 33 connected to the pulse amplifier 31, a sawtooth wave convergence circuit 34 connected to the pulse amplifier 31 and a buffer amplifier 36. The sine wave generator 33 includes a parallel connected resonance circuit 32 which is capable of effecting resonance at the frequency of 15.75 KHz and a transistor $T_2$ having a collector connected to the resonance circuit 32 for converting the pulse signal from the pulse amplifier 31 to a sinusoidal waveform. The sawtooth wave convergence circuit 34 includes a transistor $T_3$ which functions as a switching transistor and an emitter follower transistor $T_4$. These transistors $T_3$ and $T_4$ constitute a bootstrap circuit. The buffer amplifier 36 includes a transistor $T_5$ having a base thereof connected to the pulse amplifier 31, the sine wave generator 33 and the sawtooth wave convergence circuit 34 for establishing a composite waveform including pulse wave, sinusoidal wave and sawtooth wave.

Figure 5A:
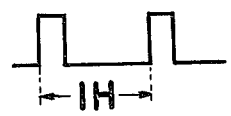
FIGS. 5(a) to 5(d) are diagrams showing waveforms appearing at various points in the circuit shown in FIG. 4.

The waveform composition circuit 20 as described above is fed with horizontal synchronizing pulse signal applied to an input 31a of the pulse amplifier 31. Upon receipt of such horizontal synchronizing pulse signal, a pulse signal is produced from the collector of the transistor $T_1$, the waveform thereof being shown in FIG. 5(a).

Figure 5B:
Figure 5C:
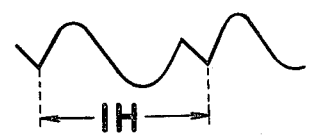
Figure 5D:
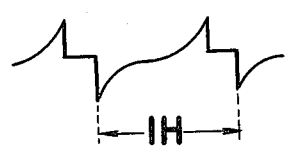

Upon receipt of such pulse signal, there is produced a sawtooth waveform pulse as shown in FIG. 5(b) from the emitter of the transistor $T_4$ while a sine wave pulse as shown in FIG. 5(c) is produced from the collector of the transistor $T_2$. Upon application of such pulse signals shown in FIGS. 5(a), 5(b) and 5(c) to the transistor $T_5$, a primary correction signal as shown in FIG. 5(d) is produced from the emitter of the transistor $T_5$.

The DC amplifier 30 includes transistors $T_7$ and $T_8$ which cooperate with each other to form a differential amplifier, a transistor $T_6$ being so connected to emitters of the transistors $T_7$ and $T_8$ as to serve as an input impedance of the differential amplifier, and a transistor $T_9$ connected between the base of the transistor $T_8$ and ground. The primary correction signal obtained from the emitter of the transistor $T_5$ is fed to the base of the transistor $T_6$ and is amplified with the linearity thereof being improved in the differential amplifier.

A luminance adjusting circuit 50 for adjusting the luminance of the established color picture is connected to the base of the transistor $T_9$. Upon receipt of DC signal from the luminance adjusting circuit 50, the transistor $T_9$ operates so as to adjust level of a signal obtained from the collector of the transistor $T_7$ proportionally to the DC signal. Accordingly, a main correction signal is produced from the collector of the transistor $T_7$ and is fed through a suitable capacitor to the phase separation circuit 40.

The phase separation circuit 40 includes a transistor $T_{10}$. The main correction signal is fed to the base of the transistor $T_{10}$. From the emitter of the transistor $T_{10}$, there is produced a first correction signal which is supplied to a red video amplifier 54 for correcting a chrominance signal or color difference signal R-Y produced from a color signal amplifier 55. On the other hand, from the collector of the transistor $T_{10}$, there is produced a second correction signal which is supplied to a blue video amplifier 53 for correcting a color difference signal B-Y produced from the color signal amplifier 55. It is to be noted that the first correction signal produced from the eitter of the transistor $T_{10}$ has the same phase as that of the signal applied to the base thereof, while the second correction signal produced from the collector of the transistor $T_{10}$ has a phase opposite to that of the signal applied to the base thereof.

It is to be noted that the first and second correction signals, which have been described as supplied to red and blue video amplifiers 54 and 55, respectively, in the foregoing embodiment, can be supplied, after having been amplified to a predetermined value, to a first grid (not shown) of the cathode ray tubes 1 and 3, respectively, so as to directly control a scanning beam in the cathode ray tube.

Although the foregoing description is particularly directed to the correction circuit which corrects the irregularity in the established color picture in a horizontal direction, which is in parallel to the direction of alignment of the three cathode ray tubes, the irregularity in the established color picture in a vertical direction caused by the law of cosine of the fourth power of the angle can be eliminated by one correction circuit which simultaneously operates on all the three difference signals R-Y, G-Y and B-Y.

It is to be noted that the brightness of the established color picture on the screen is more or less influenced by the type of screen employed. For example, in the case where the screen is of a type constituted by a material such as milky acrylic sheet which diffuses light beam almost equally towards the surroundings of the screen where observers are situated, the brightness of the established color picture would be reduced. In this case, the amplitude of the first and second correction signals are reduced in consideration of the reduction in brightness of the established color picture.

On the other hand, in the case where the screen is of a type, such as disclosed in the copending U.S. Patent Application Ser. No. 839,597 which diffuses light beams intensively in directions towards the observers and not in directions upwards and downwards of the projecting screen, the brightness of the established color picture is high. In this case, the amplitude of the first and second correction signals are increased in consideration of the increase in brightness.

In either of the cases described above, it has been observed by the present inventor that the irregularity in the established color picture is advantageously eliminated.

Figure 6:
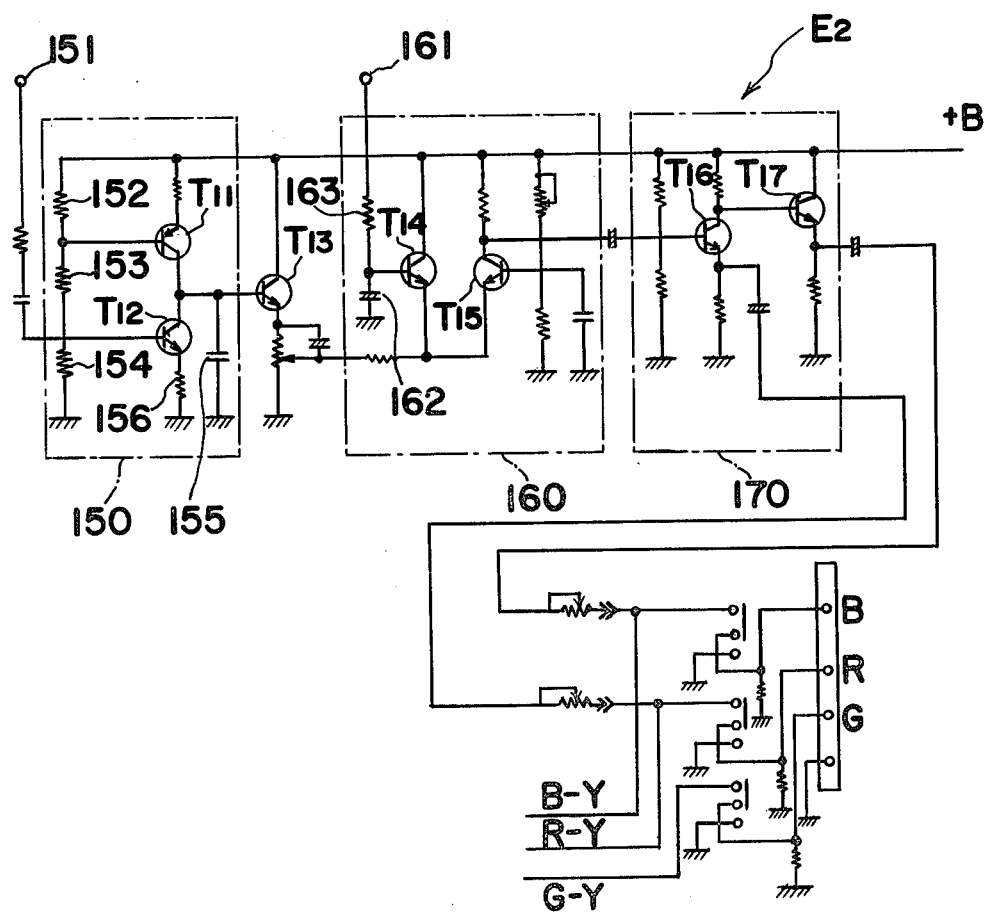
FIG. 6 is a circuit diagram similar to FIG. 4, but particularly showing a modification thereof.

Referring to FIG. 6, there is shown a correction circuit $E_2$ which is a modification of the correction circuit $E_1$ described hereinbefore. The correction circuit $E_2$ comprises a sawtooth wave generating circuit 150, an amplitude control circuit 160 and an impedance convergence circuit 170 which are connected in series.

Figure 7A:
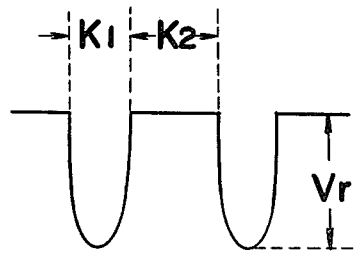
FIGS. 7(a) to 7(f) are diagrams showing waveforms appearing at various points in the circuit shown in FIG. 6.
Figure 7B:

The sawtooth wave generating circuit 150 includes transistors $T_{11}$ and $T_{12}$ which are connected in series between the ground and a positive power supply line, a capacitor 155 connected between the ground and a junction between the transistors $T_{11}$ and $T_{12}$, and resistors 152, 153 and 154 which are connected in series between the ground and the positive power supply line. These resistors 152, 153 and 154 serve as bleeder for supplying a biasing current to the transistors $T_{11}$ and $T_{12}$. Upon application of the horizontal synchronizing pulse signal, as shown in FIG. 7(a), to an input 151 of the sawtooth wave generating circuit 150, the transistor $T_{11}$ conducts during a period $K_1$ as indicated in FIG. 7(a), to rapidly charge the capacitor 155. During the next period $K_2$ as indicated in FIG. 7(a), only the transistor $T_{12}$ conducts and the transistor $T_{11}$ is maintained in a non-conductive state so as to discharge the capacitor 155 through the transistor $T_{12}$ and a resistor 156 with a time constant determined by the capacitance of the capacitor 155 and resistance of the transistor $T_{12}$ and the resistor 156. With such arrangement described above, there is produced a sawtooth pulse signal having such a waveform as shown in FIG. 7(b) from the collector of the transistor $T_{12}$. Thus produced sawtooth pulse signal is supplied to the amplitude control circuit 160 through a transistor $T_{13}$.

Figure 7C:
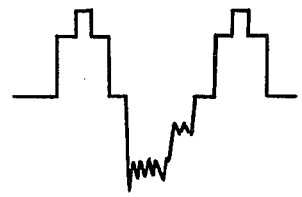
Figure 7D:

The amplitude control circuit 160 includes a base-grounded transistor $T_{15}$ and a transistor $T_{14}$ which controls the gain of the transistor $T_{15}$ in relation to an average level of a video signal as shown in FIG. 7(c) supplied to an input 161 of the amplitude control circuit 160. More particularly, the video signal (luminance signal) supplied to the input 161 is integrated in an integrator circuit constituted by a resistor 163 and a capacitor 162. Such integrated video signal indicative of the average level of the video signal is applied to the base of the transistor $T_{14}$ so as to control the amplitude of the sawtooth pulse signal through the transistor $T_{15}$. For example, in the case where the video signal is reduced, that is, when the image on the screen becomes dark, the voltage level at the base of the transistor $T_{14}$ increases to increase the voltage level at the emitter of the transistor $T_{15}$, thereby decreasing the gain of the transistor $T_{15}$. As a result the amplitude of the sawtooth pulse signal produced from the collector of the transistor $T_{15}$ is reduced.

Figure 7E:
Figure 7F:

The impedance convergence circuit 170 includes transistors $T_{16}$ and $T_{17}$ which are connected in series between the ground and the positive power supply line and are connected to each other. The sawtooth pulse signal produced from the collector of the transistor $T_{15}$ is applied to the base of the transistor $T_{16}$ for producing the first correction signal, as shown in FIG. 7(e), from the emitter of the transistor $T_{16}$ while the sawtooth pulse signal passed through the transistor $T_{16}$ is applied to the base of the transistor $T_{17}$ for producing the second correction signal, as shown in FIG. 7(f), from the emitter of the transistor $T_{17}$. Thereafter, in a similar manner as hereinbefore described in connection with the previous embodiment, the first correction signal having the same phase as that of the signal produced from the collector of the transistor $T_{17}$ is supplied to the red video amplifier while the second correction signal having a phase opposite to the phase of the signal produced from the collector of the transistor $T_{17}$ is supplied to the blue video amplifier.

According to one preferred arrangement of the correction circuit $E_2$ described with reference to FIG. 6, major electric elements such as resistors and capacitors employed in the circuit have their values given hereinbelow:

Capacitor 155 ... 8,200 pF
Resistor 156 ... 1 KΩ
Resistor 163 ... 100 KΩ
Capacitor 162 ... 1 μF Although the present invention has been fully described by way of examples with reference to the accompanying drawings, it is to be noted that various changes and modifications are apparent to those skilled in the art. Such changes and modifications are, unless they depart from the true scope of the present invention, to be understood as included therein.

I claim:

1. A projection type color television system which comprises, in combination:
    a projecting screen means;
    three cathode ray tubes for projecting a color picture on the projecting screen means, each of the three cathode ray tubes having a phosphor screen for producing and projecting onto the projecting screen means a different one of the three primary colors of a light beam containing image information therein, said cathode ray tubes being so positioned with their respective phosphor screens placed on a first imaginary plane in a parallel relation to the projecting screen means and in alignment with each other along a first imaginary line parallel to a horizontal scanning direction of the light beam, one of said cathode ray tubes, which produces the primary color having the highest brightness measured in lumens, being positioned intermediately between the other two cathode ray tubes;
    an optical lens means provided for each cathode ray tube and disposed in front of the phosphor screen, in the direction towards the screen means, for focusing the beams on the projecting screen means, said optical lens means being so positioned as to have respective principal planes on a second imaginary plane in parallel relation to the projecting screen means, and in alignment with each other, along a second imaginary line which is parallel to the first imaginary line, said lens means being positioned such that the center of the phosphor screen of each of the cathode ray tubes, the center of the corresponding lens means and the center of the projecting screen means are in an aligned relation with each other; and
    a correction circuit means coupled to at least said other two cathode ray tubes for correcting the brightness of the projected image of said other two cathode ray tubes such that the ratio of brightness of the projected image on the screen by each of said other two cathode ray tubes on the sides of the center cathode ray tube is substantially the same with respect to the projected image on the screen of the center cathode ray tube whereby the ratio of brightness of the three colors is the same over the entire area of the projecting screen means;
    wherein the correction of the brightness of two colors corresponding to said other two cathode ray tubes is carried out by the following equations:

$$b(\alpha) = \cos^4\alpha - \frac{\cos^4(\alpha + \beta)}{\cos^4\beta} \quad (a)$$

$$r(\alpha) = \cos^4\alpha - \frac{\cos^4(\alpha - \beta)}{\cos^4\beta} \quad (b)$$

wherein $b(\alpha)$ and $r(\alpha)$ represent respective amounts of brightness to be corrected, $\alpha$ represents a horizontal projecting angle of the light beam projected from the cathode ray tube onto the projecting screen means in relation to an axial direction of the cathode ray tube and $\beta$ represents the angle defined between a line extending from the center of said one of the cathode ray tubes to the center of the projecting screen means and a line extending from the center of the respective other two cathode ray tubes to the center of the projecting screen means.

2. A system as claimed in claim 1, wherein each of the equations (a) and (b) gives an approximately straight line.

3. A system as claimed in claim 1, wherein the three primary colors are red, green and blue, said one of said cathode rays producing the light beam of green.

* * * * *